(12) United States Patent
Schoubye et al.

(10) Patent No.: US 6,340,003 B1
(45) Date of Patent: Jan. 22, 2002

(54) METHOD OF OPERATING A COMPRESSION IGNITION ENGINE

(75) Inventors: Peter Schoubye, Hørsholm; Poul Erik Højlund Nielsen, Fredensborg; Niels Jørgen Blom, Hillerød, all of (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/732,756

(22) Filed: Dec. 11, 2000

Related U.S. Application Data

(60) Provisional application No. 60/169,934, filed on Dec. 10, 1999.

(51) Int. Cl.[7] .................................................. F02B 43/10
(52) U.S. Cl. ............................................................. 123/3
(58) Field of Search ........................ 123/1 A, 3, 179.16

(56) References Cited

U.S. PATENT DOCUMENTS 4,422,412 A * 12/1983 Norton ........................ 123/1 A
5,097,803 A * 3/1992 Galvin ............................ 123/3
5,119,775 A * 6/1992 Kokubo et al. .......... 123/179.16

* cited by examiner

Primary Examiner—Marguerite McMahon
(74) Attorney, Agent, or Firm—Ostrolenk, Faber, Gerb & Soffen, LLP

(57) ABSTRACT

Method of operating a compression engine on dimethylether containing fuel obtained by conversion of methanol primary fuel, comprising the steps of:

(a) pressurising the primary methanol fuel in its liquid form to a final engine injection pressure;

(b) preheating the pressurised primary fuel by heat contained in engine exhaust gas;

(c) introducing and converting the primary fuel at injection temperature of the engine and the injection pressure to dimethylether containing fuel by contact with a methanol dehydration catalyst; and (d) injection the dimethylether containing fuel at the injection pressure and temperature into the engine.

3 Claims, 1 Drawing Sheet

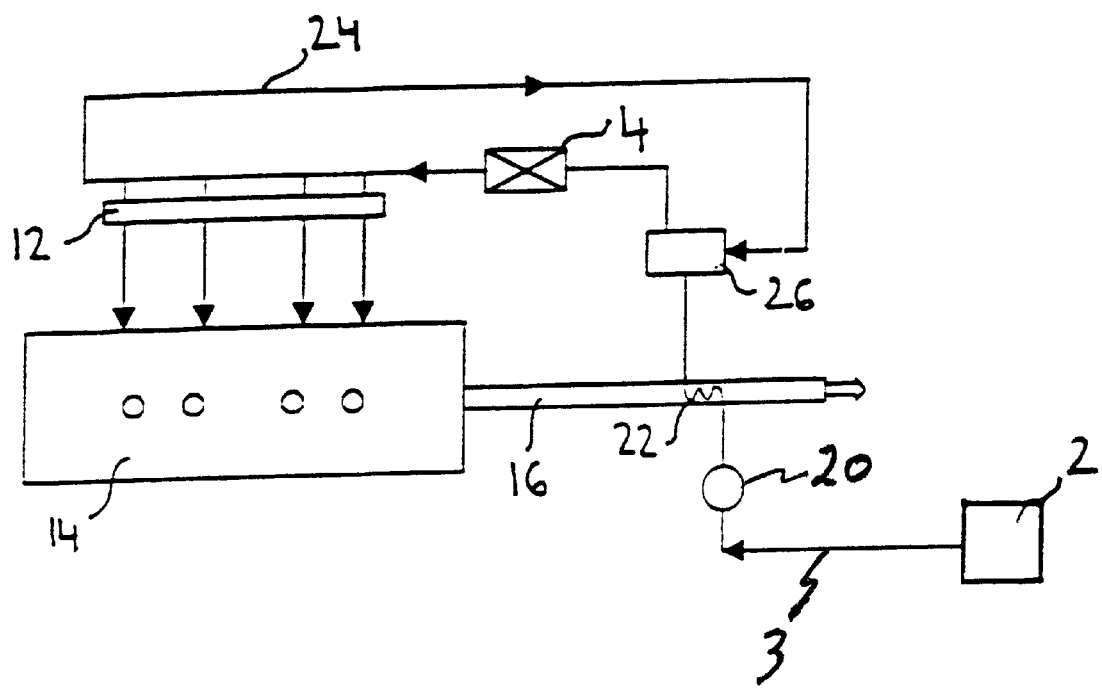

METHOD OF OPERATING A COMPRESSION IGNITION ENGINE

This application claims the benefit of U.S. Provisional Application No. 60/169,934, filed Dec. 10, 1999.

BACKGROUND OF THE INVENTION

The present invention is directed to a method of operating compression ignition engines and in particular to the operation of those engines with methanol containing primary fuel.

The most typical example of a compression ignition engine is the Diesel engine operating with high cetane numbered Diesel fuel. To reduce environmental pollution arising from combustion of Diesel fuel, several attempts have been made in the past to replace Diesel fuel with alternative fuels having reduced impact on the environment.

Such an alternative fuel for use in Diesel engines is disclosed in European Patent No. 775,185. The fuel of this disclosure consists mainly of dimethylether with a content of up to 20% methanol and water.

Despite its clean combustion characteristics and high efficiency in a Diesel engine, the main disadvantage of dimethylether based fuels is difficult storage and handling on board of vehicles. At ambient conditions, dimethylether is in the gaseous phase. To transform the fuel to its more convenient liquid form, the dimethylether fuel has to be stored and handled under high pressure.

The general object of this invention is to provide a method of converting a primary fuel of methanol on board a vehicle to dimethylether containing fuel for operating a compression ignition engine without the difficulties of handling and storing of the fuel in particular in vehicles.

SUMMARY OF THE INVENTION

In accordance with the above object, this invention relates a method of operating a compression engine on dimethylether containing fuel obtained by conversion of methanol primary fuel, comprising the steps of:

pressurising the primary methanol fuel in its liquid form to a final engine injection pressure;

preheating the pressurised primary fuel by heat contained in engine exhaust gas;

introducing and converting the primary fuel at injection temperature of the engine and the injection pressure to dimethylether containing fuel by contact with a methanol dehydration catalyst; and injecting the dimethylether containing fuel at the injection pressure and temperature into the engine.

During operation cycles with low load or start up of the engine, the exhaust gas may be at a temperature which is insufficient to supply the necessary ignition temperature to the primary methanol fuel. At those conditions, it is preferred to include a further step in the above operation method of additionally preheating the fuel with heat from combustion of part of the produced dimethylether containing fuel in a burner.

Operating conditions in the inventive method are adjusted to obtain a dimethylether fuel with desired ignition properties.

Ether fuels for use in compression ignitions with useful ignition and combustion characteristics are the above mentioned dimethylether/methanol/water mixture with a methanol content of up to 20% and water content of up to 20%. In WO Patent Application No. PCT/EP00/05275, Diesel fuel containing dimethylether, methanol and up to 48% water have been shown to be efficient fuels in compression ignition engines.

Within the above ranges of the dimethylether fuel composition, the operating conditions of the inventive method are typically adjusted to an injection temperature of between 250° C. and 350° C. and an injection pressure of between 15 and 30 Mpa. Thereby, conversion of methanol to a mixture of dimethylether, water and methanol proceeds at appropriate reaction rate of a dehydration catalyst in adiabatic manner.

The terms "injection temperature" and "injection pressure" as used herein above and in the following description means the temperature and pressure at which the dimethylether/water/methanol fuel is injected into the engine cylinders.

BRIEF DESCRIPTION OF THE DRAWINGS

The above features and aspects of the invention are explained in more detail in the following description by reference to the drawing in which the sole FIGURE schematically shows a common rail fuel injection system provided with a methanol dehydration reactor for use in the inventive method.

DETAILED DESCRIPTION OF THE PREFERRED EMBODIMENT

Referring to the drawing, a compression ignition engine with a common rail fuel injection system for use in a specific embodiment of the invention comprises a methanol tank 2 connected by line 3 to adiabatic operated dehydration reactor. The system comprises further a common rail injection port 12 with injection valves (not shown) to control flow of injected fuel into engine 14. Hot exhaust gas is vented from the engine through exhaust channel 16. When operating the system at normal load methanol is pumped and pressurized to injection pressure from tank 2 by methanol pump 20. The pressurised methanol is subsequently indirectly preheated in heat exchanger 22 to reaction temperature, e.g. 250° C. to 300° C., with heat from hot engine exhaust flowing on the shell side of exchanger 22 in channel 16. During normal engine load cycles, the preheated methanol is passed to methanol dehydration reactor 4 provided with a fixed bed of methanol dehydration catalyst. Dimethylether/methanol/water fuel with the above mentioned composition range is withdrawn from reactor 4 and passed to common rail injection system 12. During start or at low load cycles of the engine, the engine exhaust gas temperature may not be sufficiently high to provide appropriate heat in heat exchanger 22. At these engine cycles a part of the dimethylether fuel by-passes injection rail 12 through line 24 and is burned in a heater 26 to provide additional heat to the methanol feed prior to introduction into reactor 4.

The above description and FIGURE referenced to is purely schematic to explain the essential feature of the invention. Conventional parts and means in a compression ignition engine, including injection valves in the common rail system and by-pass lines, are not shown in the FIGURE.

What is claimed is:

1. Method of operating a compression engine on a dimethylether containing fuel obtained by conversion of methanol primary fuel, comprising the steps of:

(a) pressurizing the primary methanol fuel in its liquid form to a final engine injection pressure;

(b) preheating the pressurized primary fuel by heat contained in engine exhaust gas;

(c) introducing the primary fuel to a reactor and converting the primary fuel at injection temperature of the engine and the injection pressure to the dimethylether containing fuel by contact with a methanol dehydration catalyst in the reactor;

(d) withdrawing the dimethylether containing fuel from the reactor; and (e) injecting the dimethylether containing fuel as produced in the reactor at the injection pressure and temperature as the sole fuel directly into the engine.

2. The method of claim 1, including the further step of additionally preheating the fuel with heat from combustion of part of the produced dimethylether containing fuel in a burner.

3. The method of claim 1, wherein the dimethylether containing fuel includes up to 20% methanol and up to 48% water.

* * * * *